United States Patent [19]
Sato

[11] Patent Number: 5,959,802
[45] Date of Patent: Sep. 28, 1999

[54] SIGNAL RECORDING AND/OR REPRODUCING APPARATUS, METHOD, AND MEDIUM WITH PILOT SIGNAL AND TRACKING SERVO SIGNAL RECORDED AT DIFFERENT AZIMUTH ANGLES

[75] Inventor: Tsuguo Sato, Kanagawa, Japan

[73] Assignee: Sony Corporation, Tokyo, Japan

[21] Appl. No.: 08/500,500

[22] Filed: Jul. 11, 1995

[30] Foreign Application Priority Data

Jul. 15, 1994 [JP] Japan ................................. 6-163945
Jul. 5, 1995 [JP] Japan ................................. 7-170018

[51] Int. Cl.$^6$ ................................................. G11B 5/584
[52] U.S. Cl. ................................. 360/77.14; 360/77.13; 360/31; 386/79
[58] Field of Search ..................... 360/77.15, 131, 360/134, 31, 18, 21, 7, 77.17, 77.13, 77.14; 386/78, 79

[56] References Cited

U.S. PATENT DOCUMENTS

| | | | |
|---|---|---|---|
| 4,843,493 | 6/1989 | Furuhata | 360/77.15 |
| 4,860,130 | 8/1989 | Yokosawa | 360/77.15 |
| 5,191,491 | 3/1993 | Zweighaft | 360/77.13 |
| 5,325,246 | 6/1994 | Guisinger | 360/77.13 |

*Primary Examiner*—Alan Faber
*Attorney, Agent, or Firm*—Jay H. Maioli

[57] ABSTRACT

A method and apparatus for recording and/or reproducing signal on or from a recording medium includes correct tracking servo signals which may be produced so that tracking errors may be detected correctly. The pilot signal from a recording amplifier 3, produced by frequency-dividing system clocks by a frequency divider 2, is recorded on the recording medium by a servo head 21 at the timing of a timing signal $GP_1$. A tracking servo signal, obtained by reproducing the pilot signal by a recording/reproducing head 22, delaying the resulting signal by a delay circuit 4 and phase-shifting the resulting delayed signal by a phase shifting unit 5, is recorded at the timing of a timing signal $GP_2$. The pilot signal and the tracking servo signal are reproduced by the recording/reproducing head 22 and the pilot signal is delayed by the delay circuit 4. An XOR circuit 11 takes an XOR between the reproduced tracking servo signal and the delayed pilot signal and the resulting signal of the XOR circuit is sampled and held by a sampling hold circuit 13 for detecting a servo error signal $D_0$.

3 Claims, 12 Drawing Sheets

SIGNAL RECORDING AND/OR REPRODUCING APPARATUS, METHOD, AND MEDIUM WITH PILOT SIGNAL AND TRACKING SERVO SIGNAL RECORDED AT DIFFERENT AZIMUTH ANGLES

BACKGROUND OF THE INVENTION

This invention relates to a method and apparatus for recording and/or reproducing signal on or from a recording medium. The present invention also relates to a recording medium for recording signals thereon.

Among the conventional servo formatting systems for recording tracking servo signals on a track of a recording medium for detecting tracking errors, there are a self-formatting system in which servo formatting is performed on the recording medium during signal recording, and a pre-formatting system in which the recording medium is previously formatted prior to its shipment. In a tape-shaped recording medium employed in e.g., a video tape recorder, the self-formatting system is generally employed in view of cost.

A tracking servo signal, recorded on a tape-shaped recording medium in accordance with the conventional self-formatting system, is now explained by referring to FIG. 12.

During data recording, a specified frequency signal is recorded by a leading servo head 51 in a domain $T_{30}$ of the tape-shaped recording medium, as shown in FIG. 12A. The signal in a domain $T_{31}$ is DC-erased by a recording/reproducing head 52, while the signal in a domain $T_{32}$ is DC-erased by a recording/reproducing head 53, for forming a tracking servo signal pattern $F_1$.

During data reproduction, the servo head 51 pre-traces the same track position as that during data recording for reproducing the tracking servo signal pattern $F_1$. The reproduced signal is level-detected for deriving a signal $V_1$ shown in FIG. 12B. The signal $V_1$ is compared to a reference level m to derive a signal $V_2$. Subsequently, a sampling pulse $SP_1$ delayed by time $TS_1$ from the signal $V_2$ and a sampling pulse $SP_2$ delayed by time $TS_2$ from the signal $V_2$ are generated. Then, as tracking servo data, data $D_1$ and $D_2$ are obtained on sample-holding the level of the signal $V_1$ by the sampling pulse $SP_1$ and sample-holding the level of the signal $V_2$ by the sampling pulse $SP_2$, respectively. The track position can be detected by comparing the data $D_1$ and $D_2$ to each other.

The method for detecting the tracking servo signals from the signals recorded on the recording medium is termed the level difference detecting method.

If, with the above-described tracking servo signal detecting method, fluctuations are incurred in the level of the detected signal $V_1$, both data $D_1$ and $D_2$ are changed, so that the correct track position cannot be detected.

On the other hand, if, when a tape-shaped recording medium, on which a tracking servo signal pattern $F_1$ has been recorded by a servo head of a signal recording apparatus, is to be reproduced by another signal recording apparatus, the servo head of the second-stated signal recording apparatus has a track width broader than a track width $W_1$ of the servo head of the first stated signal recording apparatus, there is produced a dead zone in the detected tracking servo signal due to the difference in the track widths of the two servo heads. That is, there are occasions where the tracking servo signals are lowered in detection accuracy under the effects of head tolerances of servo heads provided in the two signal recording apparatus.

In addition, should there be any fluctuations in the widths of the recording/reproducing heads 52, 53, ill effects tend to be produced during recording of the tracking servo signal pattern $F_1$.

OBJECT AND SUMMARY OF THE INVENTION

It is therefore an object of the present invention to provide a method and apparatus for recording and/or reproducing signals and a recording medium wherein tracking errors may be accurately detected using correct tracking servo signals.

In one aspect, the present invention provides a signal recording apparatus for recording signals on a recording medium having means for generating a pilot signal of a reference phase, means for generating a tracking servo signal having a pre-set phase relation to the pilot signal, means for recording the pilot signal on the recording medium, and means for recording the tracking servo signal on the recording medium with an azimuth different from that used for recording the pilot signal.

Specifically, the signal recording apparatus frequency-divides the system clocks by frequency dividing means to generate a pilot signal and records the pilot signal from the frequency dividing means by a servo head on the recording medium based upon a timing signal from timing signal generating means. The apparatus then reproduces the pilot signal and delays the reproduced pilot signal by delaying means based upon system clocks. The apparatus then records the tracking servo signal from the delaying means by a recording head having an azimuth different from that of the servo head based upon the timing signal from the timing signal generating means.

In another aspect, the present invention provides a signal reproducing apparatus for reproducing signals from a recording medium wherein the pilot signal having a reference phase and the tracking servo signal having a pre-set phase relation with respect to the pilot signal are read from the recording medium, and the tracking error is detected using a phase difference between the pilot signal and the tracking servo signal. The tracking servo signal has the same recording wavelength as the pilot signal and is recorded with azimuth different from that for the pilot signal.

Specifically, the signal reproducing apparatus reproduces the pilot signal and the tracking servo signal from the recording medium by a reproducing head and delays the reproduced tracking servo signal by delaying means based upon system clocks. The apparatus then XORs (exclusive ORs) the tracking servo signal and the pilot signal from the delaying means by detection means in order to detect a servo error signal.

In still another aspect, the present invention provides a signal recording and/or reproducing apparatus for recording and/or reproducing a signal on or from a recording medium, wherein a pilot signal having a reference phase and a tracking servo signal having a pre-set phase relation with respect to the pilot signal are recorded on the recording medium. The tracking servo signal has the same recording wavelength as the pilot signal and is recorded with azimuth different from that for the pilot signal. The pilot signal and the tracking servo signal recorded on the recording medium are read out from the recording medium and the tracking error is detected using the phase difference between the pilot signal and the tracking servo signal.

In still another aspect, the present invention provides a signal recording method for recording signals on a recording medium including generating a pilot signal of a reference phase, generating a tracking servo signal having a pre-set phase relation to the pilot signal, recording the pilot signal on the recording medium, and recording the tracking servo signal on the recording medium with an azimuth different from that used for recording the pilot signal.

In a still another aspect, the present invention provides a tracking error detecting method for detecting a tracking error wherein the pilot signal having a reference phase and the tracking servo signal having a pre-set phase relation with respect to the pilot signal are read from the recording medium, and the tracking error is detected using a phase difference between the pilot signal and the tracking servo signal. The tracking servo signal has the same recording wavelength as the pilot signal and is recorded with azimuth different from that for the pilot signal.

In a still another aspect, the present invention provides a signal recording and/or reproducing method including recording a pilot signal having a reference phase and a tracking servo signal having a pre-set phase relation with respect to the pilot signal on a recording medium, reading out the pilot signal and the tracking servo signal recorded on the recording medium, and detecting a tracking error using a phase difference between the pilot signal and the tracking servo signal. The tracking servo signal has the same recording wavelength as the pilot signal and is recorded with azimuth different from that for the pilot signal.

In yet another aspect, the present invention provides a recording medium having recorded thereon a pilot signal having a reference phase and a tracking servo signal having a pre-set phase relation with respect to the pilot signal. The tracking servo signal has the same recording wavelength as the pilot signal and the same recording wavelength as the pilot signal and is recorded with azimuth different from that for the pilot signal.

With the signal recording method and apparatus according to the present invention, a pilot signal having a reference phase and a tracking servo signal having a pre-set phase relation with respect to the pilot signal and the same recording wavelength as the pilot signal are recorded on the recording medium, with the tracking servo signals being recorded with an azimuth different from that for the pilot signal, so that correct tracking servo signals unaffected by level fluctuations in the reproducing signal may be produced to allow for detection of correct tracking servo signals. On the other hand, the tracking servo signal may be prohibited from being deteriorated in detection precision due to head tolerances.

With the signal reproducing apparatus and the tracking error detection method according to the present invention, the pilot signal having a reference phase and the tracking servo signal having a pre-set phase relation with respect to the pilot signal and the same recording wavelength as the pilot signal, with the tracking servo signals being recorded with an azimuth different from that for pilot signals, are read out from the recording medium, and the tracking error is detected using the phase difference between the pilot signal and the tracking servo signal, so that correct tracking servo signals unaffected by level fluctuations in the reproducing signal may be produced thus assuring correct detection of the tracking servo signals.

With the signal recording and/or reproducing method and apparatus according to the present invention, the pilot signal having a reference phase and the tracking servo signal having a pre-set phase relation with respect to the pilot signal and the same recording wavelength as the pilot signal, with the tracking error signals being recorded with an azimuth different from that for the pilot signal, are read out from the recording medium, and the tracking error is detected using the phase difference between the pilot signal and the tracking servo signal, thereby allowing to prevent the tracking servo signal from being lowered in detection precision due to head tolerances during data reproduction. In addition, since the servo signals can be processed by a limiting amplifier, correct tracking servo signals unaffected by level fluctuations in the reproducing signals can be produced, thereby assuring correct detection of tracking error signals.

With the recording medium of the present invention, having recorded thereon a pilot signal having a reference phase and a tracking servo signal having a pre-set phase relation with respect to the pilot signal and the same recording wavelength as the pilot signal, with the tracking servo signals being recorded with an azimuth different from that for the pilot signal, thereby again producing correct tracking servo signals unaffected by level fluctuations in the reproducing signal and assuring correct detection of the tracking servo signals.

DESCRIPTION OF THE INVENTION

Figure 1:
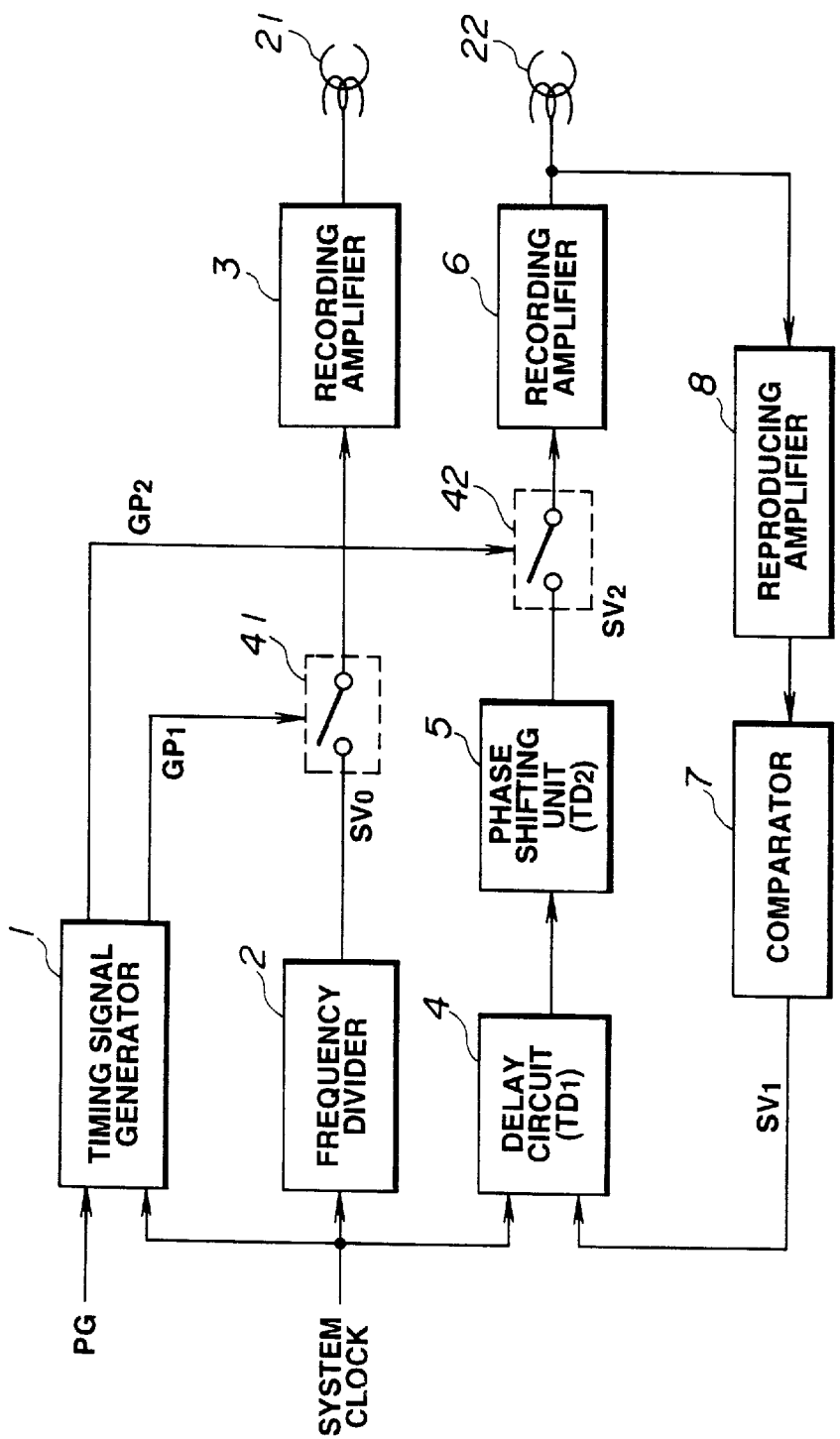
FIG. 1 is a schematic block diagram showing a signal recording apparatus according to the present invention.
Figure 2:
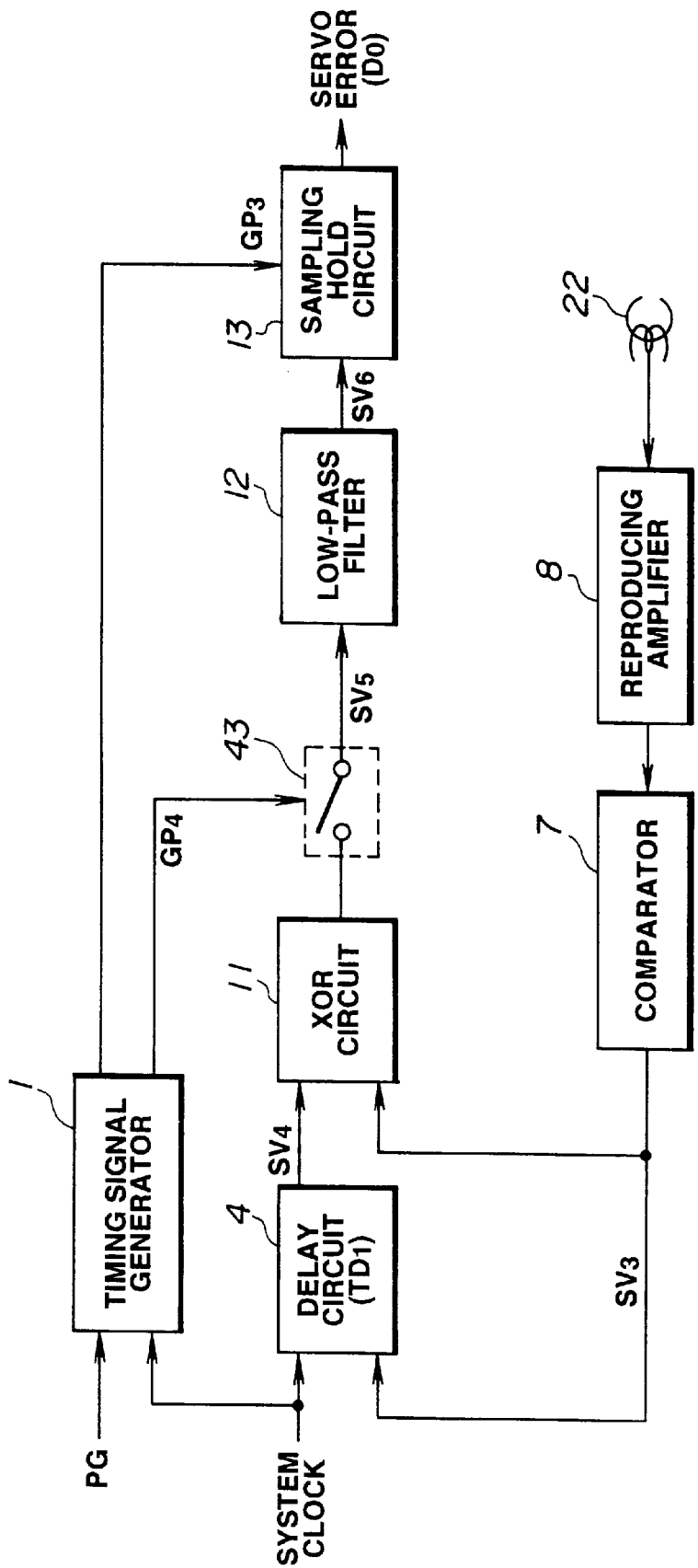
FIG. 2 is a schematic block diagram showing a signal reproducing apparatus according to the present invention.

Referring to the drawings, preferred embodiments of the present invention will be explained in detail. FIGS. 1 and 2 are schematic block diagrams of a signal recording apparatus and a signal reproducing apparatus according to the present invention, respectively. In the signal recording apparatus and signal reproducing apparatus, a tape-shaped recording medium is employed as a recording medium.

The signal recording apparatus shown in FIG. 1 records a pilot signal having a reference phase, and a tracking servo signal, on the recording medium. The tracking servo signal has a pre-set constant phase relation with respect to the pilot signal and also has the same recording wavelength as and an azimuth (recording angle) different from the pilot signal.

Specifically, the signal recording apparatus includes a timing signal generator 1, operating as timing signal generating means for generating plural timing signals, and a frequency divider 2 operating as frequency dividing means for dividing the frequency of system clocks for generating the pilot signals. The signal recording apparatus also includes a servo head 21 for recording the pilot signals from the frequency divider 2 on the recording medium based upon the timing signals from the timing signal generator 1, and a delay circuit 4 and a phase shifting unit 5, operating as delay means for delaying a pilot signal reproduced from the recording medium a pre-set time based upon the system clocks for generating a tracking servo signal having a constant phase difference from the pilot signal. The apparatus also has a recording head having an azimuth different from that of the servo head and configured for recording the tracking servo signal outputted by the phase shifting unit 5 based upon the timing signal from the timing signal generator 1 with the same recording wavelength as that of the pilot signal.

The tracking servo signal has a phase difference of 90 with respect to the pilot signal.

The signal reproducing apparatus shown in FIG. 2 reads out the pilot signal recorded with the reference phase on the recording medium and the tracking servo signal having a pre-set constant phase relation with respect to the pilot signal and also having the same recording wavelength as and different azimuth for recording from the pilot signal, and detects the tracking error using the phase difference between the pilot signal and the tracking servo signal.

Specifically, the signal reproducing apparatus includes a timing generator 1, operating as timing signal generating means for generating plural timing signals based upon system clocks, and a reproducing head for reproducing the pilot signals and the tracking servo signals from the recording medium. The signal reproducing apparatus also includes a delay circuit 4 for delaying the pilot signal reproduced by the reproducing head a pre-set time based upon the system clocks, and detecting means for taking XOR (exclusive OR) of the tracking servo signal reproduced by the reproducing head and the pilot signal from the delay means and sampling-holding the resulting XOR output for detecting a servo error signal. The detection means is made up of an XOR circuit 11, a low-pass filter 12 and a sampling hold circuit 13.

The recording head and the reproducing head are shown in FIGS. 1 and 2 as a recording/reproducing head 22 executing the recording and reproducing operations.

First, the recording of tracking servo signals by the signal recording apparatus of the embodiment of FIG. 1 is explained.

System clocks of the present signal recording device are fed to the timing signal generator 1, frequency divider 2 and to the delay circuit 4.

The timing signal generator 1 is fed with a pulse signal PG. The pulse signal PG, a signal having the same period as the rotational period of a rotary drum, is outputted by the rotary drum. The timing signal generator 1 generates and outputs timing signals $GP_1$, $GP_2$ based upon the input system clocks and the pulse signals PG. The input system clocks are divided in frequency by the frequency divider 2 and routed as a pilot signal $SV_0$ to a signal switching unit 41.

Figure 3:
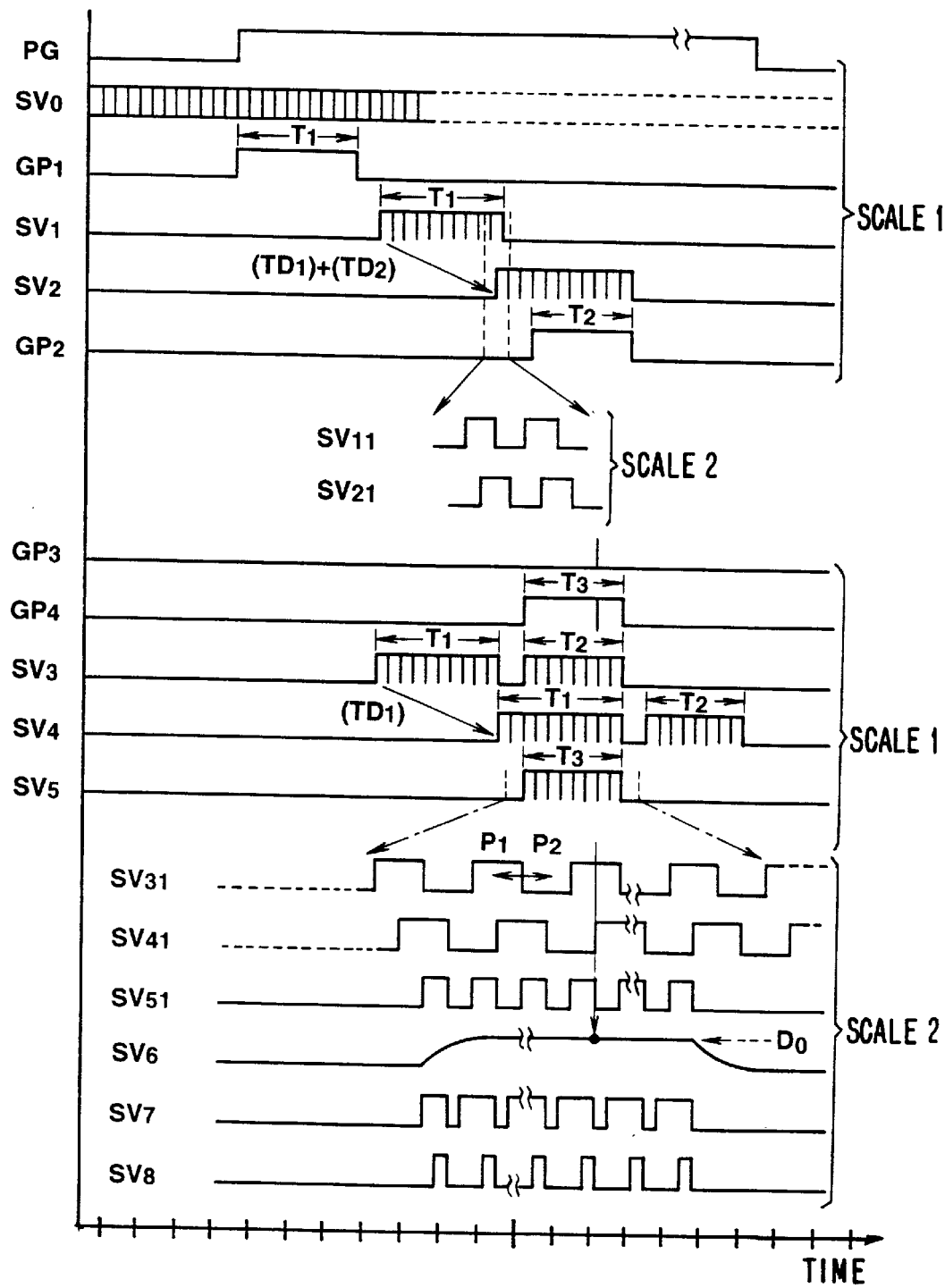
FIG. 3 illustrates recording/reproduction of tracking servo signal patterns.
Figure 4:
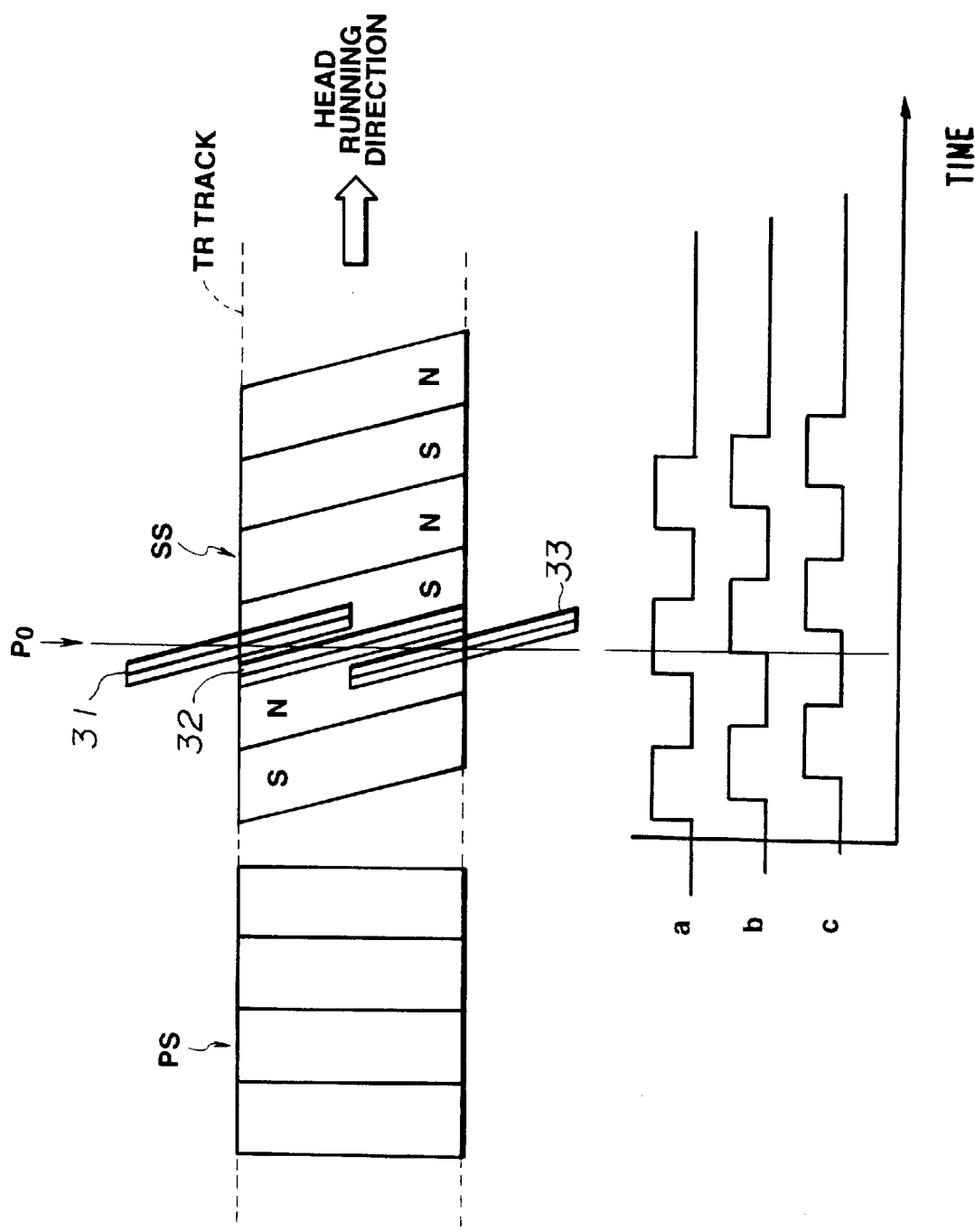
FIGS. 4A and 4B show the relation between the tracking servo signal and the reproducing head.

To the signal switching unit 41 is coupled the timing signal $GP_1$ from the timing signal generator 1 at a timing shown in FIG. 3. This causes the pilot signal $SV_0$ from the frequency divider 2 to be outputted to a recording amplifier 3. The pilot signal $SV_0$ via the recording amplifier 3 is sent to the servo head 21 travelling in advance of a recording/reproducing head 22. By this servo head 21, the zero-azimuth pilot signal $SV_0$ is recorded on an area PS on a track TR of the tape-shaped recording medium shown in FIG. 4A. The track TR in FIG. 4A represents a portion of a single track.

The recording/reproducing head 22, following the servo head 21, reproduces the recorded pilot signal $SV_0$. The pilot signal $SV_0$, reproduced by the recording/reproducing head 22, is sent via a reproducing amplifier 8 to a comparator 7. The comparator 7 wave-shapes the pilot signal $SV_0$ to a rectangular waveform. The wave-shaped pilot signal $SV_0$ represents a signal $SV_1$ shown in FIG. 3. The signal $SV_1$ is entered to the delay circuit 4 so as to be delayed by a pre-set time $TD_1$. The signal $SV_1$, delayed by the pre-set time $TD_1$, is sent to the phase shifting unit 5.

The phase shifting unit 5 shifts the signal $SV_1$ further by a time $TD_2$ so that the signal $SV_1$ will have a phase difference of 90° with reference to the pilot signal $SV_1$. This generates a signal $SV_2$ of FIG. 3. This signal $SV_2$ is sent to a signal switching unit 42.

To this signal switching unit 42 is coupled the timing signal $GP_2$ from the timing signal generator 1 at a timing shown in FIG. 3. This routes the signal from the phase shifting unit 5 to the recording/reproducing head 22 via the recording amplifier 6. This recording/reproducing head 22 records the signal $SV_2$ as a tracking servo signal on an area SS of the track TR on the tape-shaped recording medium as shown in FIG. 4A.

It should be noted that the azimuth of the servo head 21 differs from that of the recording/reproducing head 22. Thus the tracking servo signal having the same recording wavelength as that of the pilot signal and different in azimuth at the time of recording from the pilot signal is recorded on the recording medium.

In FIG. 3, the signal $SV_1$ enlarged in waveform is shown as a signal $SV_{11}$, while the signal $SV_2$ enlarged in waveform is shown as a signal $SV_{21}$.

In this manner, the tracking servo signal pattern is recorded on a recording medium.

This tracking servo signal pattern is reproduced by the signal reproducing apparatus shown in FIG. 2.

When tracing the same track position as that in which the pilot signal and the tracking servo signals have been recorded during data recording, the recording/reproducing head 22 of the signal reproducing apparatus of FIG. 2, reproduces the pilot signal $SV_0$ recorded on the area PS on the track TR of the tape-shaped recording medium of FIG. 4A and subsequently reproduces the pilot signal $SV_0$ recorded on the area SS on the track TR. The pilot signal and the tracking servo signal are reproduced at this time as the signal $SV_3$ shown in FIG. 3. This the signal $SV_3$ is supplied via the reproducing amplifier 8 to the comparator 7 where it is wave-shaped and thence sent to the delay circuit 4.

The delay circuit 4 delays the wave-shaped signal $SV_3$ by a time $TD_1$ and outputs a delayed third signal $SV_4$. Since the pilot signal and the tracking servo signal are recorded with a phase difference of 90° during recording, the tracking servo signal of a domain $T_2$ of the signal $SV_2$ is detected as a signal having a phase difference of 90° relative to the pilot signal of the domain $T_1$ of the signal $SV_4$.

The signal $SV_4$ from the delay circuit 4 is sent to the XOR circuit 11 also fed with the wave-shaped signal $SV_3$ outputted by the comparator 7. Thus the XOR circuit 11 takes an XOR between the wave-shaped signal $SV_3$ and the signal $SV_4$ to output a signal $SV_5$ of FIG. 3 which is sent to a signal switching unit 43.

To this signal switching unit 43 is coupled the timing signal $GP_4$ from the timing signal generator 1 at a timing shown in FIG. 3. Thus the signal $SV_5$ of the domain $T_3$, gated by the timing signal $GP_4$, is outputted, as shown in FIG. 3.

The tracking servo signal of the signal $SV_3$ in the domain $T_3$, enlarged in waveform, is shown as a signal $SV_{31}$ in FIG.

3. Similarly, the tracking servo signal of the signal $SV_4$, enlarged in waveform, and the tracking servo signal of the signal $SV_4$, enlarged in waveform, are shown as a signal $SV_{41}$ and as a signal $SV_{51}$ in FIG. 3. It is seen from the relation between the signal $SV_{31}$ and the signal $SV_{41}$ that the tracking servo signal detected by the signal $SV_3$ and the pilot signal detected by the signal $SV_4$ have a phase difference of 90° relative to each other.

The signal $SV_5$ from the signal switching unit 43 is fed to the low-pass filter (LPF) 12 and limited in bandwidth to give the signal $SV_6$ shown in FIG. 3. This signal $SV_6$ is sent to the sampling hold circuit 13 fed with the timing signal $GP_3$ from the timing signal generator 1. The sampling hold circuit 13 sample and holds the signal $SV_6$ with the pulse of the timing signal $GP_3$ to output a servo error signal $D_0$. The tracking error is detected based upon the servo error signal $D_0$.

FIG. 4A shows the relation between the tracking servo signal and the reproducing head.

In FIG. 4A, it is assumed that the recording/reproducing head 22 is at one of three positions 31, 32 and 33 on the track TR for the pilot signal for the area PS and for the tracking servo signal for the area SS. The temporal reference position of the recording/reproducing head 22 passing through the track is $P_0$.

When the recording/reproducing track 22 is at the position 32, a just-tracking state is reached, so that the tracking servo signal shown at b in FIG. 4B is produced. When the recording/reproducing track 22 is at the position 31, the tracking servo signal as shown at a in FIG. 4B is produced. This tracking servo signal has a phase lead with respect to the tracking servo signal shown at b in FIG. 4B. When the recording/reproducing track 22 is at the position 33, the tracking servo signal as shown at c in FIG. 4B is produced. This tracking servo signal has a phase lag with respect to the tracking servo signal shown at b in FIG. 4B.

It is seen from above that, in the above-described signal reproducing apparatus, the tracking error signal associated with the track position can be produced in case of the phase lead or the phase lag. Since the signal $SV_2$, which is the tracking servo signal, is recorded as the phase information for the pilot signal, it is not affected by level variation or fluctuations in the width of the recording/reproducing head.

Specifically, when the pilot signal $SV_{31}$ has a lead in the direction of $P_1$ with respect to the tracking signal $SV_{41}$, that is has a phase lead, a signal $SV_7$ shown in FIG. 3 is produced when a signal outputted by the XOR circuit 11 is gated with the timing signal $GP_4$ by the signal switching unit 43. The servo error signal $D_0$, produced on sampling and holding the signal $SV_7$ by the sampling hold circuit 13 via the low-pass filter 12, is of a larger level than the servo error signal $D_0$ when the recording/reproducing head 22 is at the position 32.

Similarly, when the pilot signal $SV_{31}$ has a lead in the direction of $P_2$ with respect to the tracking signal $SV_{41}$, that is has a phase lag, a signal $SV_8$ shown in FIG. 3 is produced when a signal outputted by the XOR circuit 11 is gated with the timing signal $GP_4$ by the signal switching unit 43. The servo error signal $D_0$, produced on sampling and holding the signal $SV_8$ by the sampling hold circuit 13 via the low-pass filter 12, is of a smaller level than the servo error signal $D_0$ when the recording/reproducing head 22 is at the position 32.

Thus, by detecting the level of the servo error signal $D_0$, the tracking error and the error direction of the recording/reproducing head 22 may be identified.

Figure 5:
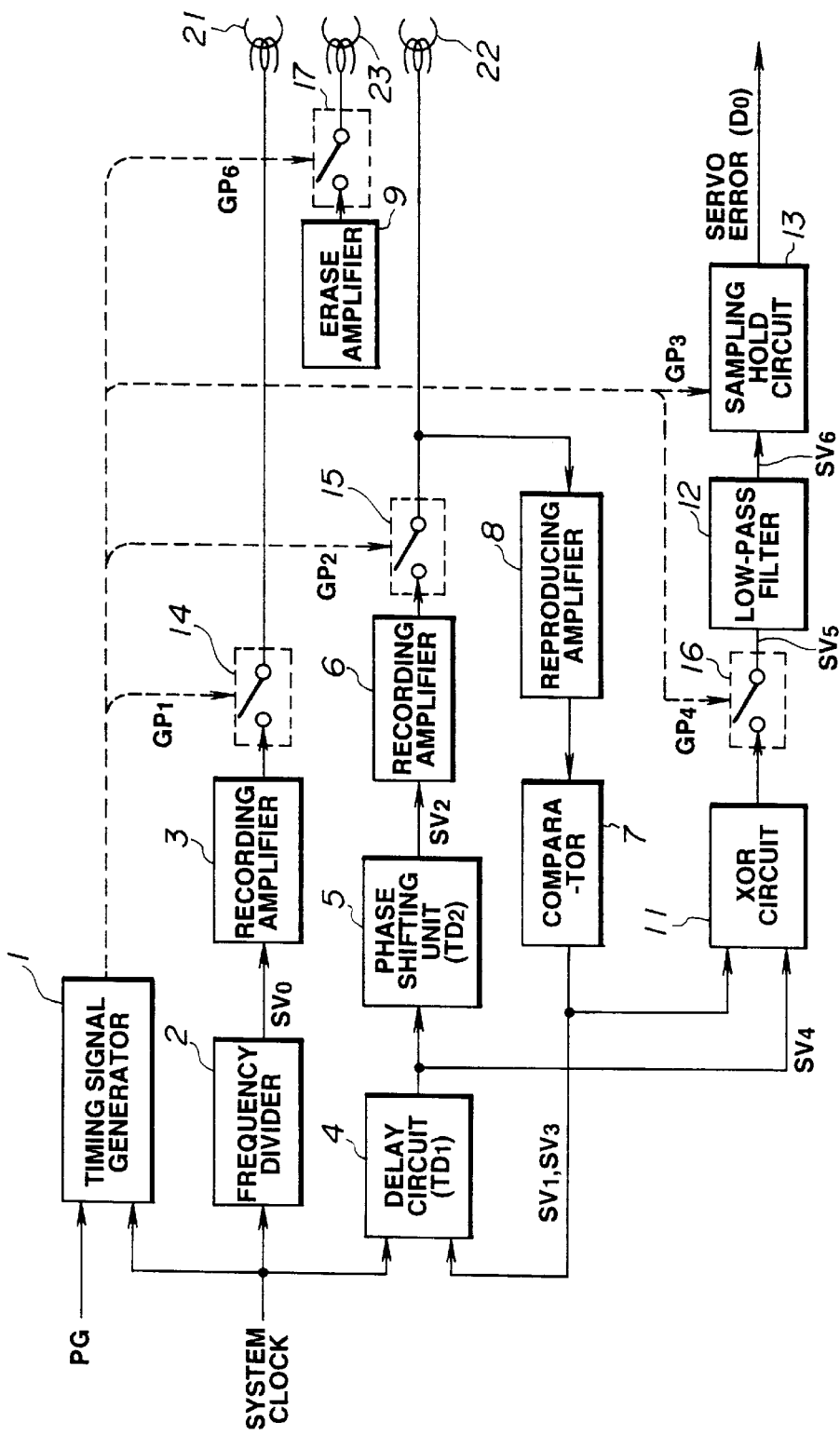
FIG. 5 is a schematic block circuit diagram showing a signal recording/reproducing apparatus according to the present invention.

FIG. 5 shows, in a schematic block diagram, a signal recording/reproducing apparatus of the present invention.

The present signal recording/reproducing apparatus has the construction of both the signal recording apparatus and the signal reproducing apparatus as described above. Consequently, with the signal recording/reproducing apparatus shown in FIG. 5, the timing signal generator 1, frequency divider 2, recording amplifier 3, delay circuit 4, phase shifting unit 5, recording amplifier 6, comparator 7, recording amplifier 8, XOR circuit 11, low-pass filter 12 and the sampling hold circuit 13 perform the same function as that described n connection with FIGS. 1 and 2. The signal switching units 14, 15 and 16 of FIG. 5 correspond to the signal switching units 41, 42 and 43 of FIGS. 1 and 2, respectively. The relative disposition between the signal switching unit 14 and the recording amplifier 3 and that between the signal switching unit 15 and the recording amplifier 6 in the signal recording/reproducing apparatus in FIG. 5 are reversed from the relative disposition between the signal switching unit 41 and the recording amplifier 3 and that between the signal switching unit 42 and the recording amplifier 6 in the signal recording/reproducing apparatus in FIG. 1. However, any of the relative disposition between the signal switching unit and the recording amplifier shown in FIGS. 1 or 5 may be optionally employed.

The servo head 21 may also be employed as a data erasure head, while the recording/reproducing heads 22, 23 may also be employed as data recording/reproducing heads.

The signal recording/reproducing apparatus of FIG. 5 may be employed for e.g., a video tape recorder (VTR). The schematic construction of the video tape recorder is shown in FIG. 6, wherein a magnetic tape 60 is employed as the recording medium.

Figure 6:
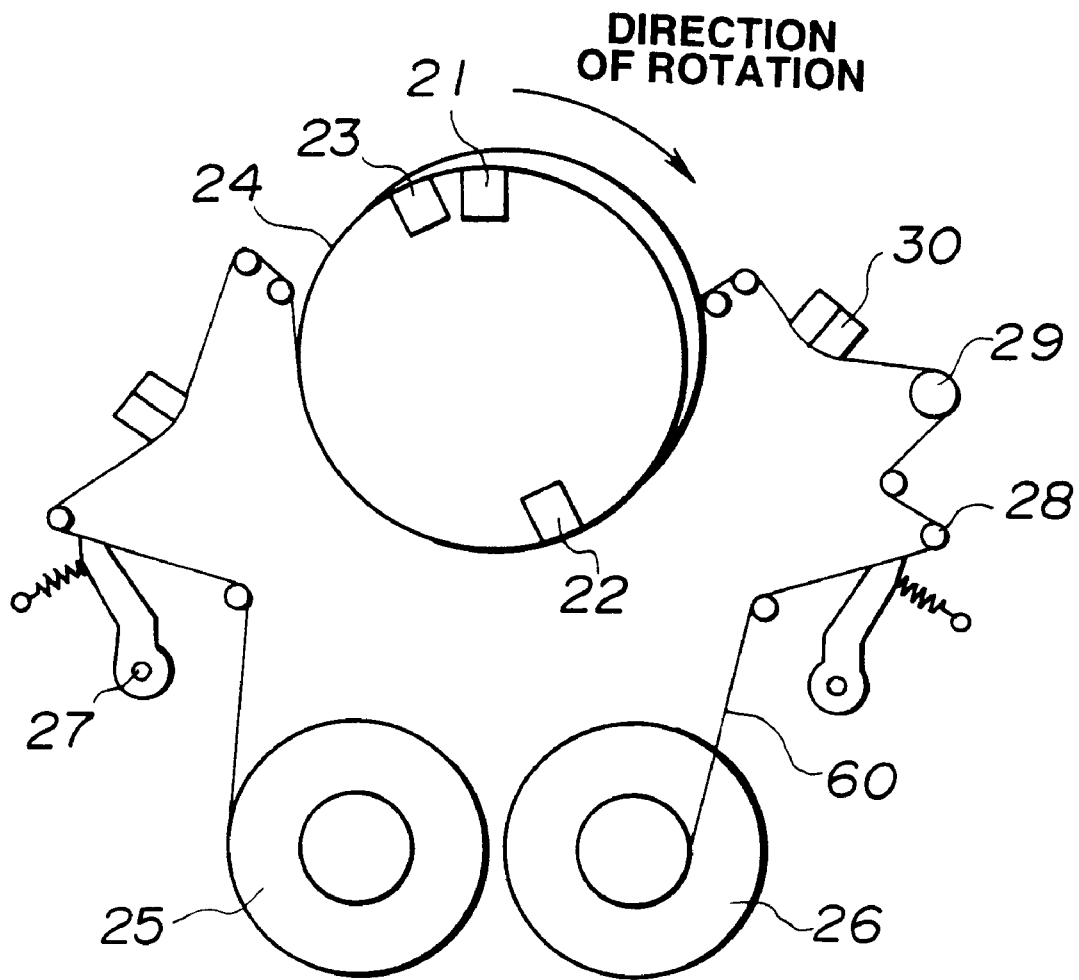
FIG. 6 illustrates a schematic arrangement of a VTR.

Referring to FIG. 6, a supply (S) reel 25 and a take-up (T) reel 26 are run in rotation by an electric motor, not shown. The tension values of the magnetic tape 60 from a supply (S) tension regulator 27 and a takeup (T) tension regulator 28 are derived in dependence upon the rpm of the supply reel 25 and the takeup reel 26. The torque values to be supplied to the supply reel 31 and the takeup reel 32 are derived from these tension values. Rotation of the supply reel 25 and the takeup reel 26 is controlled by controlling the running of the motor in dependence upon these torque values.

The magnetic tape 60 is run along the outer periphery of the rotary drum 24 from the supply reel 25 via the supply tension regulator 27. The rotary drum 24 is rotated in an arrow mark direction. The running direction of the magnetic tape 60 is opposite to that of the rotary drum 24. The signal recording and reproduction on or from the magnetic tape 60 is carried out by the servo head 21 and the recording/reproducing heads 22, 23 mounted on the rotary drum 24. The magnetic tape 60 is wrapped around the takeup reel 26 by the intermediary of a control head 30, a capstan 29 and a takeup tension regulator 26. The capstan 29 is run in rotation by a capstan driving circuit, not shown. This capstan driving circuit is controlled by the servo error signal $D_C$ for controlling the running speed of the magnetic tape 60 for adjusting the tracking.

The recording state for the tracking servo signal is explained in detail. By first referring to FIG. 7, the first embodiment of the tracking servo signal recording state is explained.

The fist embodiment constitutes one block with two tracks A and B. It suffices in this case to record a tracking servo signal pattern in one of the tracks A and B, with the capture range for the tracking servo signals being ±1 tracks. The tracking servo signal pattern is a combination of the pilot signal and the tracking servo signal. One or more tracking servo pattern(s) are recorded on the track A or the track B.

Figure 7:
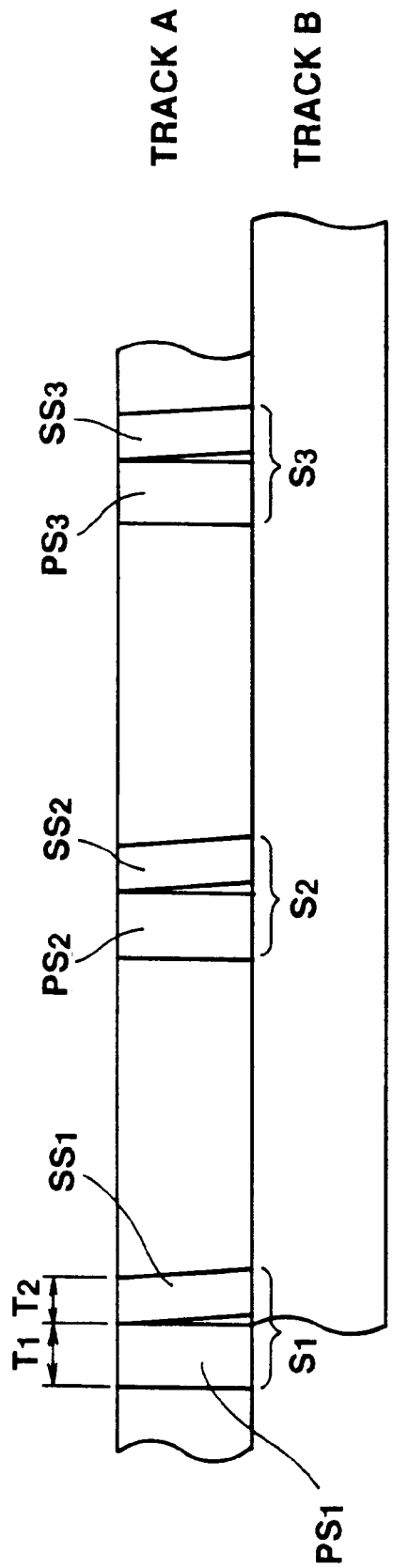
FIG. 7 illustrates a first embodiment of the recording state for tracking servo signals.

In FIG. 7, three tracking servo signal patterns, namely a tracking servo signal pattern $S_1$ made up of a region $PS_1$ having the pilot signal $SV_C$ recorded thereon and a region $SS_1$ having a tracking servo signal recorded thereon, a tracking servo signal pattern $S_2$ made up of area $PS_2$ having the pilot signal $SV_C$ recorded thereon and an area $SS_2$ having a tracking servo signal recorded thereon, and a tracking servo signal pattern $S_1$ made up of an area $PS_3$ having the pilot signal $SV_C$ recorded thereon and an area $SS_3$ having a tracking servo signal recorded thereon.

Figure 8:
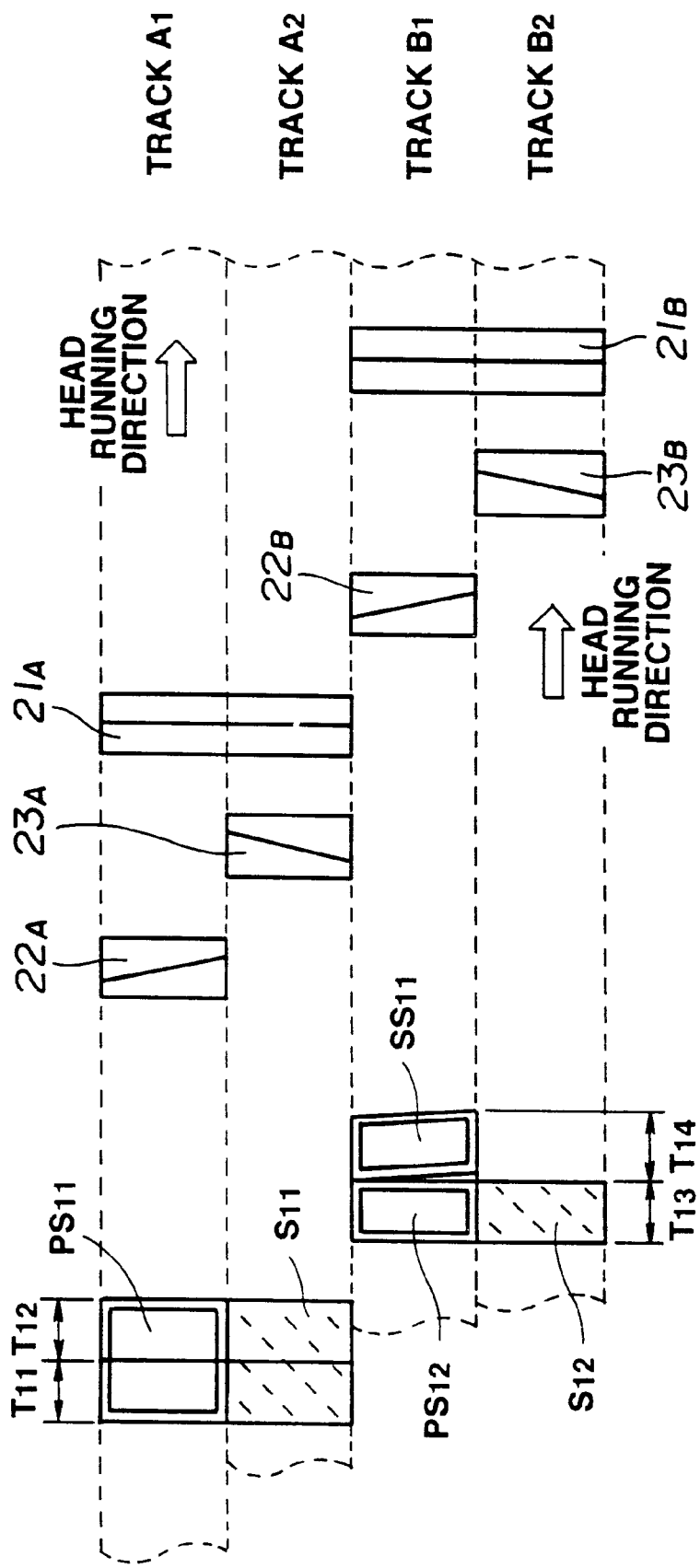
FIG. 8 illustrates a second embodiment of the recording state for tracking servo signals.

A second embodiment of the recording state for the tracking servo signals is explained by referring to FIG. 8.

With the present second embodiment, four tracks, namely tracks $A_1$, $A_2$, $B_1$, $B_2$ make up one block and, if the servo head 21 has a width corresponding to two tracks, the recording/reproducing head is captured into a tracking servo signal pattern with the aid of a tracking servo capturing signal pattern recorded in one track.

The rotary drum of the data recording/reproducing apparatus employed in the second embodiment, that is VTR, is provided with an array of a servo head $21_A$ and two recording/reproducing heads $23_A$, $22_A$, and an array of a servo head $21_B$ and two recording/reproducing heads $23_B$, $22_B$, at a diametrically opposite positions to the firstly stated heads. With the data recording/reproducing apparatus, provided with these six heads, the rotary drum is rotated by one-half revolution so that data recording/reproduction is made on or from the two tracks $A_1$, $A_2$ using the servo head $21_A$ and two recording/reproducing heads $23_A$, $22_A$, and then the rotary drum is rotated by one-half revolution so that data recording/reproduction is made on or from the two tracks $B_1$, $B_2$ using the servo head $21_B$ and two recording/reproducing heads $23_B$, $22_B$.

Figure 9:
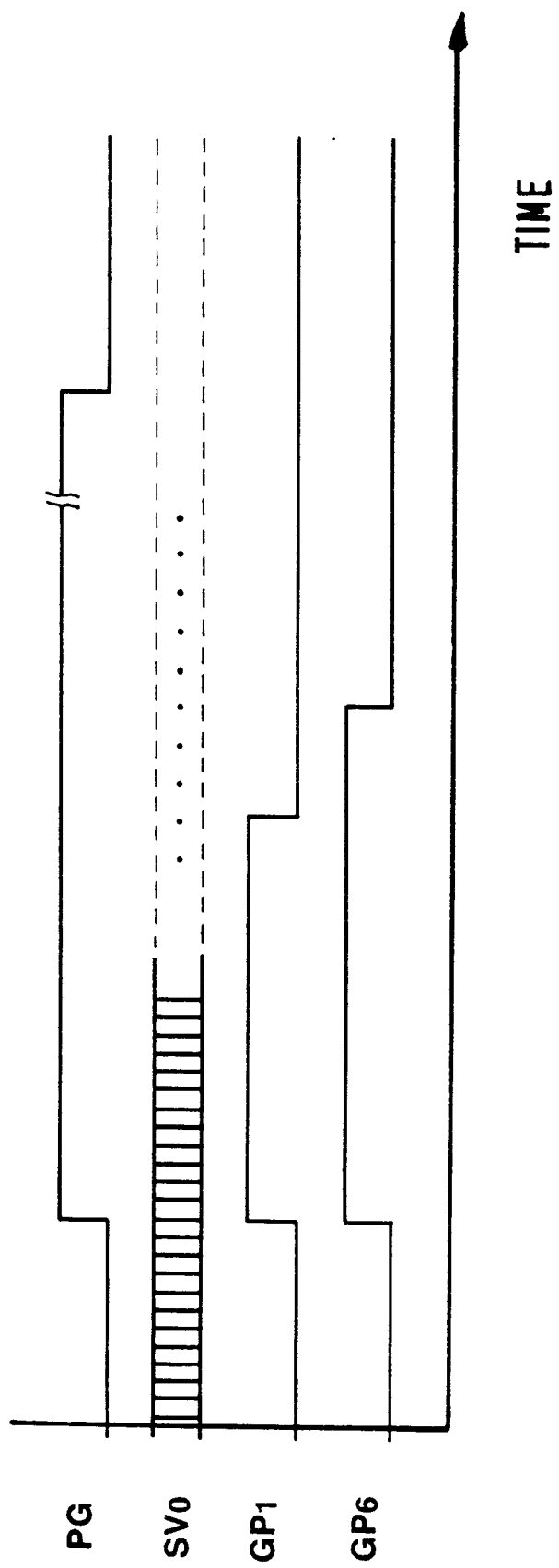
FIG. 9 illustrates a tracking servo capturing signal pattern of FIG. 8.

The recording of the tracking servo capturing signal pattern to the tracks $A_1$, $A_2$ is explained. The pilot signal $SV_C$ is continuously recorded on domains $T_{11}$, $T_{12}$ across the tracks $A_1$, $A_2$ by the leading servo head $21_A$ at a timing of the timing signal $GP_1$ shown in FIG. 9.

A part of the pilot signal thus recorded is then DC erased, using the recording/reproducing head $23_A$. Specifically, the signal from the erase amplifier 9 shown in FIG. 5 is routed to the recording/reproducing head $23_A$ via a signal switching unit 17 which has its movable contact connected to its fixed terminal at a timing of the timing signal $GP_e$ shown in FIG. 9. By the recording/reproducing head $23_A$ recording the signal from the erase amplifier 9 in the area $S_{11}$, the pilot signal $SV_C$ recorded in the area $S_{11}$ may be erased.

This causes the pilot signal and the tracking servo signal, having the same azimuth and the phase difference of 0°, to be recorded in the area $PS_{11}$. The tracking servo capturing signal pattern is formed from the pilot signal and the tracking servo signal.

For recording the pilot signal and the tracking servo signal, constituting the tracking servo capturing signal, with the same azimuth for recording, the pilot signal is continuously recorded by the servo head 21 for setting the in-phase relation between the pilot signal and the tracking servo signal (phase difference being 0°). Alternatively, the pilot signal and the tracking servo signal are recorded in reverse phase with each other (phase difference being 180°). For recording the pilot signal and the tracking signal in reverse phase to each other, the pilot signal $SV_C$ from the frequency divider 2 of FIG. 5 reversed in phase by 180° may be recorded as the tracking servo signal.

The pilot signal and the tracking servo signal, constituting the tracking servo capturing signal, may also be recorded with the different azimuth. If, in such case, the pilot signal and the tracking servo signal, constituting the tracking servo capturing signal, are recorded with a phase difference of −90°, the pilot signal and the tracking servo signal, constituting the tracking servo capturing signal, are recorded with the phase difference of −90°.

Figure 10:
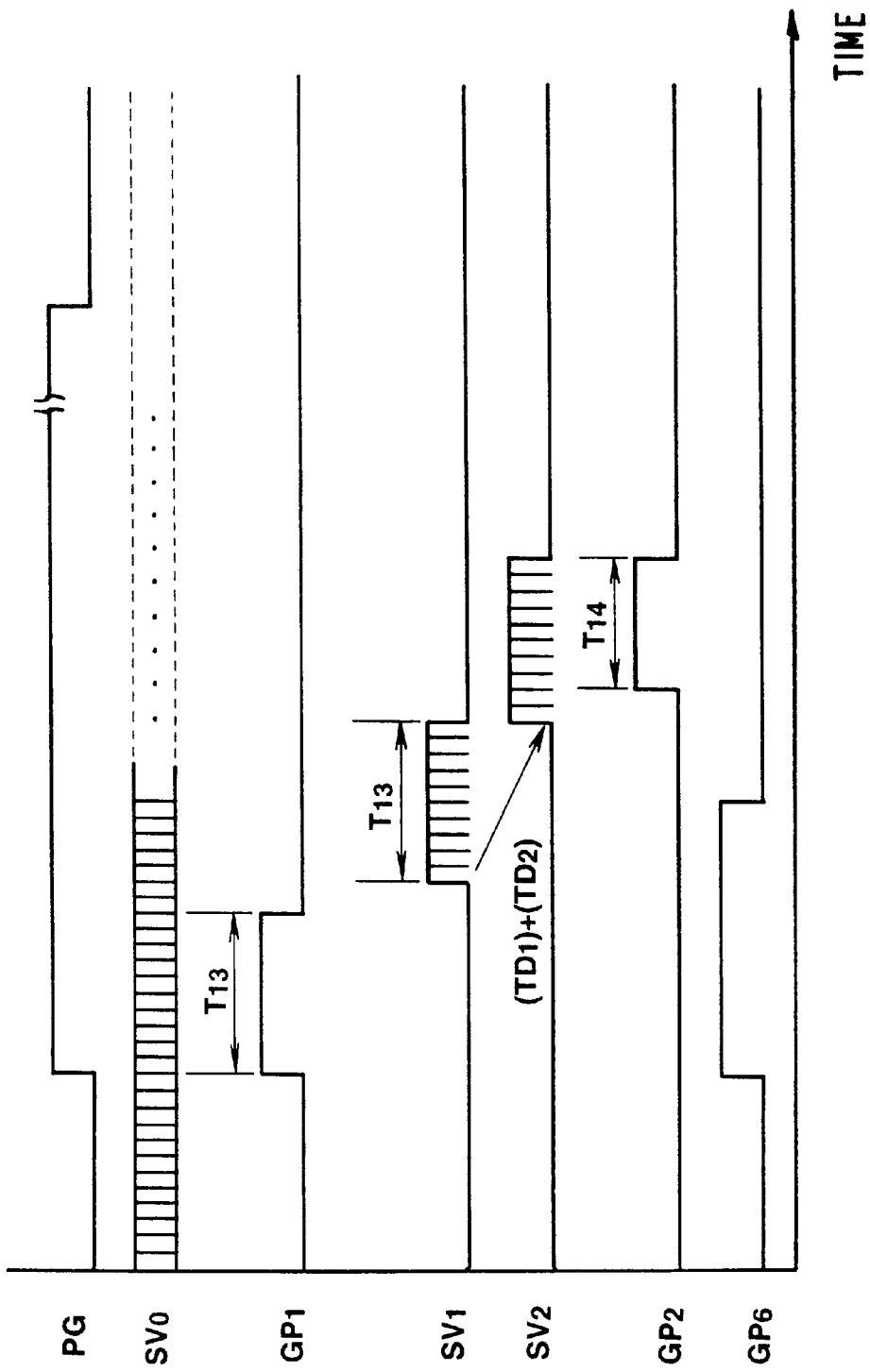
FIG. 10 illustrates a tracking servo signal pattern of FIG. 8.
Figure 11:
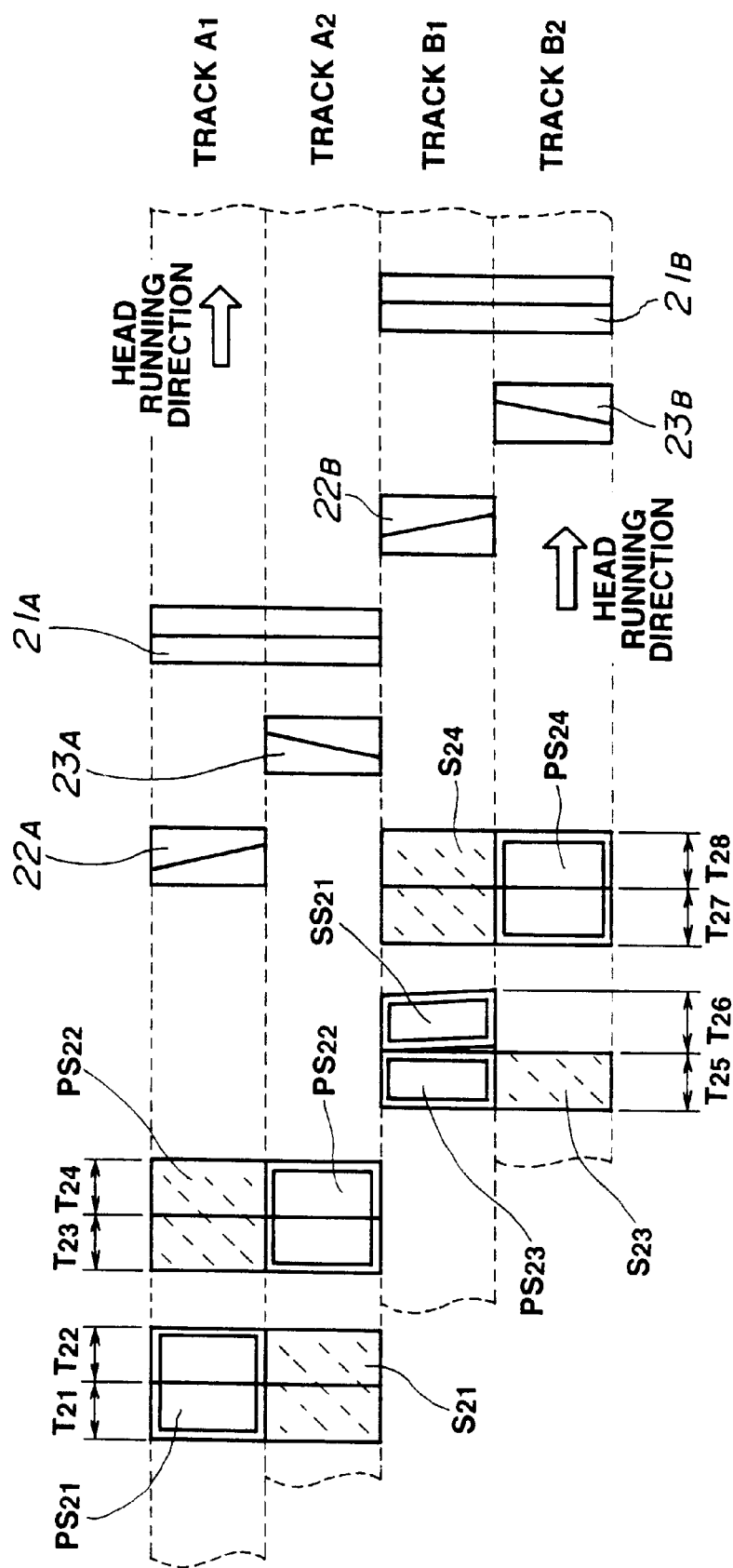
FIG. 11 illustrates a third embodiment of the recording state for tracking servo signals.
Figure 12A:
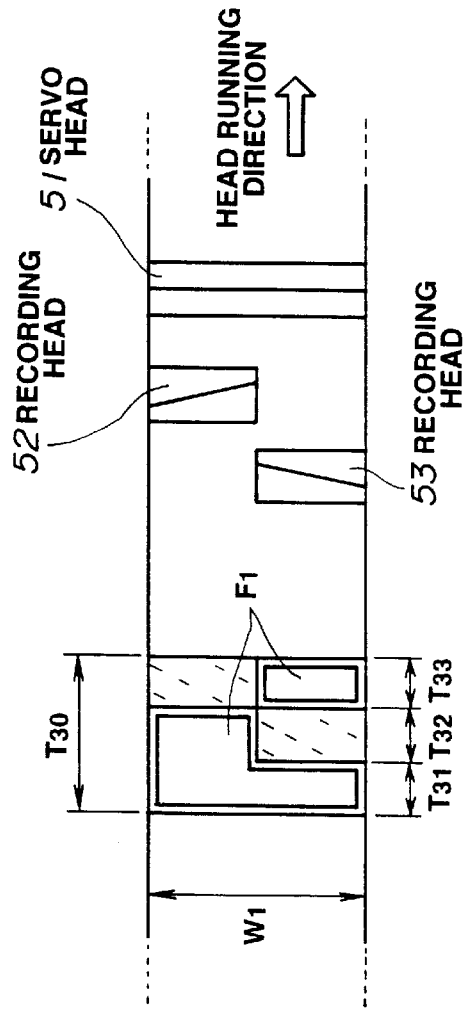
FIGS. 12A and 12B illustrate various signal waveforms and the recording state of conventional tracking servo signals.
Figure 12B:
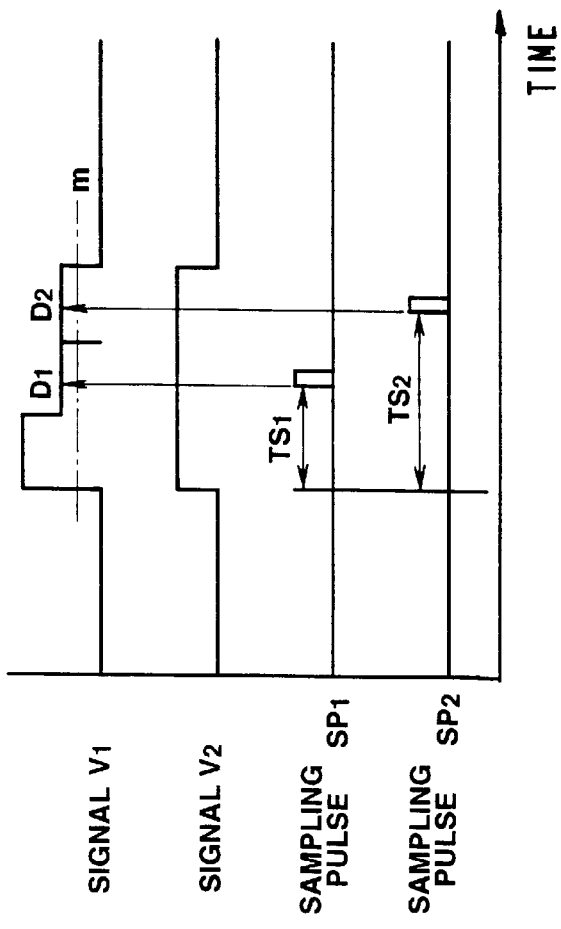

Recording of the tracking servo signal pattern on the tracks $B_1$, $B_2$ is now explained. On the tracks $B_1$, $B_2$, the pilot signal $SV_0$ is continuously recorded by the servo head $21_B$ in the domain $T_{13}$ of FIG. 8 at the timing of the timing signal $GP_1$ shown in FIG. 10. The recording signal from the recording amplifier 6, supplied via a signal switching unit 17 having its movable contact connected to its fixed terminal at the timing of the timing signal $GP_e$ shown in FIG. 10, is recorded by the recording/reproducing head $23_B$ in the area $S_{12}$ for DC-erasing the pilot signal $SV_C$ recorded in the area $S_{12}$. The recording signal from the recording amplifier 6, supplied via a signal switching unit 15 having its movable contact connected to its fixed terminal at the timing of the timing signal $GP_2$ shown in FIG. 10, is recorded by the recording/reproducing head $22_B$ in the area $SS_{11}$ of the domain $T_{14}$ for forming the tracking servo signal pattern. The pilot signal in the area $PS_{12}$ and the tracking servo signal in the area $SS_{11}$, forming the tracking servo signal pattern, are recorded with the phase difference of 90°.

If, during data recording or reproduction, the recording/reproducing head $22_B$ is at the track $B_1$ having a stable point at the track center, the servo error signal $D_0$ is a at a zero level, so that the tracking error is detected as being zero. If the recording/reproducing head $22_B$ is deviated towards the track $A_2$ or towards the track $B_2$, the recording/reproducing head $22_B$ affects the tracking servo signal pattern made up of the areas $PS_{12}$, $SS_{11}$ of the track $B_1$, so that the tracking error can be detected. If the recording/reproducing head $22_B$ is deviated towards the track $A_1$, the recording/reproducing head $22_B$ may be captured into the tracking servo signal pattern of the track $B_1$ by detecting the tracking servo capturing signal pattern. If the pilot signal and the tracking servo signal, constituting the tracking servo capturing signal, are recorded with the same azimuth and in phase with each other, as described above, the signal level for which the tracking servo capturing signal pattern is detected assumes a value of plus (+) or minus (−). If the recording/reproducing head $22_B$ is completely deviated so that it is coincident with the width of the track $A_2$ or $B_2$, the reproducing amplifier 8 of FIG. 5 is operating as a limiting amplifier and the gain may be set to a higher value so that one of the tracking servo signal pattern or the tracking servo capturing signal pattern may be detected.

If four tracks make up one block as described above, the capture range for the tracking servo signal pattern may be set to ±2 tracks by pre-recording the tracking servo capturing signal pattern in any one of tracks other than the tracks having the tracking servo signal pattern recorded thereon.

An erasure head may also be employed as a servo head.

A third embodiment of the recording state for the tracking servo signals is explained by referring to FIG. 8.

With the present third embodiment, similarly to the second embodiment, four tracks, namely tracks $A_1$, $A_2$, $B_1$, $B_2$ make up one block and, if the servo head 21 has a width corresponding to two tracks, the recording/reproducing head is captured into a tracking servo signal pattern with the aid of a tracking servo capturing signal pattern recorded in three tracks.

First, on the tracks $A_1$ and $A_2$, the pilot signal $SV_0$ is continuously recorded in the domains $T_{21}$, $T_{22}$ and in the domains $T_{23}$, $T_{24}$ at the timing of the timing signal $GP_1$ by the servo head $21_A$.

The recording/reproducing head $23_A$ then records a signal, supplied thereto from the erase amplifier 9 via the signal switching unit 17, having its movable contact connected to its fixed terminal at a timing of the timing signal $GP_e$, in the area $S_{21}$. On the other hand, the recording/reproducing head $22_A$ records a signal, supplied thereto from the erase amplifier 6 via the signal switching unit 15, having its movable contact connected to its fixed terminal at a timing of the timing signal $GP_2$, in the area $S_{22}$. The pilot signal $SV_C$, recorded in the areas $S_{21}$, $S_{22}$, is DC-erased. This generates in the areas $PS_{21}$, $PS_{22}$ the tracking servo capturing signal pattern having the same azimuth and the phase difference equal to 0°.

On the tracks $B_1$, $B_2$, the servo head $21_B$ continuously records the pilot signal $SV_C$ in the domains $T_{25}$, $T_{27}$, $T_{28}$ at the timing of the timing signal $GP_1$. The recording/reproducing head $23_B$ then records a signal, supplied thereto from the erase amplifier 9 via the signal switching unit 17, having its movable contact connected to its fixed terminal at a timing of the timing signal $GP_e$, in the area $S_{21}$. On the other hand, the recording/reproducing head $22_A$ records a signal, supplied thereto from the erase amplifier 6 via the signal switching unit 15, having its movable contact connected to its fixed terminal at a timing of the timing signal $GP_2$, in the area $S_{24}$. The pilot signal $SV_C$, recorded in the areas $S_{23}$, $S_{24}$, is DC-erased. This generates in the area $PS_{24}$ the tracking servo capturing signal pattern having the same azimuth and the phase difference equal to 0°.

In addition, by the recording/reproducing head $22_B$ recording the recording signal, supplied thereto from the signal switching unit 15, having its movable contact connected to its fixed terminal at a timing of the timing signal $GP_2$, in the area $SS_{21}$ of the domain $T_{20}$, the pilot signal of the area $PS_{23}$ and the tracking servo signal of the area $SS_{21}$ are recorded with a phase difference of 90° for forming the tracking servo signal pattern.

Thus the tracking servo capturing pattern may be recorded in three tracks other than the track having recorded therein the tracking servo signal pattern, so that the recording/reproducing head $22_B$ will be captured into the tracking servo pattern of the track $B_1$.

What is claimed is:

1. A signal recording apparatus comprising:

timing signal generating means for generating a plurality of timing signals based upon a system clock;

frequency dividing means for dividing said system clock in frequency for generating a pilot signal;

a servo head for recording the pilot signal from said frequency dividing means on said recording medium based on the timing signals from said timing signal generating means;

delay means for delaying a pilot signal reproduced from said recording medium for a pre-set time based upon said system clock for generating a tracking servo signal having a phase with a pre-set difference with respect to a phase of said reproduced pilot signal; and a recording head for recording the tracking servo signal outputted by said delay means based upon the timing signals from said timing signal generating means with the same recording wavelength as that of said reproduced pilot signal, said recording head having an azimuth angle different from an azimuth angle of the servo head.

2. A signal reproducing apparatus comprising:

timing signal generating means for generating plural timing signals based upon a system clock;

a reproducing head for reproducing a pilot signal and a tracking servo signal from the recording medium;

delay means for delaying the pilot signal reproduced by said reproducing head a pre-set delay time based upon said system clocks; and detection means for detecting a servo error signal by taking an XOR between the tracking servo signal reproduced by the reproducing head and the pilot signal from said delay means and sampling and holding the result of the XOR operation.

3. A signal recording and/or reproducing apparatus comprising:

timing signal generating means for generating a plurality of timing signals based upon a system clock;

frequency dividing means for dividing said system clock in frequency for generating a pilot signal;

a servo head for recording the pilot signal from said frequency dividing means on said recording medium based on the timing signals from said timing signal generating means;

delay means for delaying a pilot signal reproduced from said recording medium for a pre-set time based upon said system clock;

phase shifting means for shifting the pilot signal from said delaying means for generating a tracking servo signal having a phase with a pre-set difference with respect to a phase of said pilot signal;

a recording head for recording the tracking servo signal outputted by said phase shifting means based upon the timing signals from said timing signal generating means with the same recording wavelength as that of said pilot signal, said recording head having an azimuth angle different from that of an azimuth angle of the servo head;

a reproducing head for reproducing said pilot signal and said tracking servo signal from said recording medium; and detection means for detecting a servo error signal by taking an XOR between the tracking servo signal reproduced by the reproducing head and the pilot signal from said delay means and by sampling and holding the result of the XOR operation.

* * * * *